(12) United States Patent
Sun et al.

(10) Patent No.: US 8,471,759 B2
(45) Date of Patent: Jun. 25, 2013

(54) FORWARD-LOOKING 3D IMAGING RADAR AND METHOD FOR ACQUIRING 3D IMAGES USING THE SAME

(75) Inventors: Sun Gu Sun, Daejeon (KR); Gyu Churl Park, Jeonbuk (KR); Byung Lae Cho, Daejeon (KR); Jong Soo Ha, Seoul (KR)

(73) Assignee: Agency for Defense Development, Daejeon (KR)

( * ) Notice: Subject to any disclaimer, the term of this patent is extended or adjusted under 35 U.S.C. 154(b) by 100 days.

(21) Appl. No.: 13/105,096

(22) Filed: May 11, 2011

(65) Prior Publication Data

US 2011/0285577 A1 Nov. 24, 2011

(30) Foreign Application Priority Data

May 18, 2010 (KR) .................. 10-2010-0046406

(51) Int. Cl.
*G01S 13/00* (2006.01)
(52) U.S. Cl.
USPC ............ 342/70; 342/25 R; 342/175; 342/180
(58) Field of Classification Search
USPC ................ 342/25 R–25 F, 59, 179–180, 191, 342/195, 423
See application file for complete search history.

(56) References Cited

U.S. PATENT DOCUMENTS

| | | | | |
|---|---|---|---|---|
| 3,513,471 A | * | 5/1970 | Mooney Jr. et al. | 342/91 |
| 4,546,355 A | * | 10/1985 | Boles | 342/179 |
| 4,551,724 A | * | 11/1985 | Goldstein et al. | 342/25 C |
| 4,723,124 A | * | 2/1988 | Boles | 342/25 C |
| 5,189,424 A | * | 2/1993 | Brown | 342/25 C |
| 6,057,799 A | * | 5/2000 | Martin-Neira et al. | 342/351 |
| 6,081,226 A | * | 6/2000 | Caldwell et al. | 342/200 |
| 6,664,917 B2 | * | 12/2003 | Goebel et al. | 342/64 |
| 7,557,735 B1 | | 7/2009 | Woodell et al. | |
| 2008/0100510 A1 | * | 5/2008 | Bonthron et al. | 342/373 |
| 2008/0224923 A1 | * | 9/2008 | Aprile | 342/25 D |
| 2009/0079621 A1 | * | 3/2009 | Grafmueller et al. | 342/25 A |

* cited by examiner

*Primary Examiner* — John B Sotomayor
*Assistant Examiner* — Marcus Windrich
(74) *Attorney, Agent, or Firm* — Pearne & Gordon LLP (57) ABSTRACT

Disclosure is a forward-looking 3D imaging radar, comprising: a transmitting unit which generates RF signals to be radiated for observing object in front of the radar; a transmitting antenna which radiates the RF signal generated by the transmitting unit; a receiving antenna which receives signals radiated from the transmitting antenna and reflected by the object in front of the radar; a receiving unit which mixes the signal received by the receiving antenna and the branched signal from the transmitting unit, and converts the signal to digital signal; and a signal processor which controls the operations of the transmitting unit and receiving unit, sends command to the transmitting unit to generate RF signals, receives the digitally converted signal from the receiving unit and extracts phase information of the object in front of the radar, and generates 3D radar image by producing altitude information based on the principle of interferometer.

13 Claims, 7 Drawing Sheets

FORWARD-LOOKING 3D IMAGING RADAR AND METHOD FOR ACQUIRING 3D IMAGES USING THE SAME

TECHNICAL FIELD

The present invention relates to a forward-looking 3D imaging radar, and more particularly, to a forward-looking 3D imaging radar by which 3D image including altitude information at the front of the radar can be obtained, the difficulty in applying delay device on the receiver can be overcome by implementing independent receiver per receiving antenna, and radar image is processed in real time. The invention also relates to a method for acquiring 3D image by using the radar.

BACKGROUND ART

The research on the imaging radar device for an unmanned ground vehicle operating in the field has been published in the US Army Research Laboratory as an essay. But the research was on 2D imaging radar that did not include information on altitude. Although the UWB (ultra-wide band) radar for foliage penetration aimed to process conventional 2D image has proposed a method for reducing the number of receiver by applying RF delay device to the receiver and receiving a signal with differentiated delay time per receiver, it was difficult to implement exact time delay for a short time by using the RF delay, making it hard to actual implementation of hardware.

OBJECT OF THE INVENTION

The present invention has been designed to solve the problems of prior arts, and aims to provide a forward-looking 3D imaging radar by which 3D image including altitude information at the front of the radar can be obtained, the difficulty in applying delay device on the receiver can be overcome by implementing independent receiver per receiving antenna, and radar image can be processed in real time, and a method for acquiring 3D image by using the radar.

DISCLOSURE

In order to achieve the object of the present invention, the forward-looking 3D imaging radar of the present invention comprises a transmitting unit which generates RF signals to be radiated for observing object in front of the radar, a transmitting antenna which radiates the RF signal generated by the transmitting unit, a receiving antenna which receives signals radiated from the transmitting antenna and reflected by the object in front of the radar, a receiving unit which mixes the signal received by the receiving antenna and the signal transmitted by the transmitting unit, and converts the signal to digital signal, and a signal processor which controls the operations of the transmitting unit and receiving unit, sends command to the transmitting unit to generate RF signals, receives the digitally converted signal from the receiving unit and extracts phase information of the object in front of the radar, and generates 3D radar image by producing altitude information based on the principle of interferometer.

The transmitting unit comprises a DDS (Direct Digital Synthesizer) which generates transmitting waveform, a 4 channel filter bank which selects the transmitting waveform having the optimal frequency on the basis of the waveform generated by the DDS, and a high power amplifier which amplifies the output of the transmitting waveform selected through the 4 channel filter bank.

The transmitting unit preferably generates RF signal of UWB signal of wider than 1 GHz.

Also, the transmitting antenna is composed of 2 antennas.

An RF switch can be installed between the transmitting antenna and transmitting unit to select an antenna among the two transmitting antennas.

Also, the receiving unit comprises a LNA (low-noise amplifier) for amplifying the received signal from the receiving antenna, an amplifier for amplifying the branched signal from transmitting unit, a mixer for mixing the two signals and an A/D (analog-to-digital) converter for converting the analog signal mixed by the mixer to digital signal.

Also, the receiving antenna is composed of an antenna array comprising a plurality of unit antennas.

Also, the receiving antenna array is disposed in 2 dimensional arrays.

The horizontal interval between the unit antennas in the receiving antenna array is set to $\lambda/2$ and the vertical interval, d, is set to $d \leq \lambda$, where $\lambda$ is the wavelength of the transmitting signal.

Also, in order to achieve the object of the present invention, the method of acquiring 3D image by using a forward-looking 3D imaging radar, comprising a transmitting unit which generates RF signals, a transmitting antenna which radiates the RF signal, a receiving antenna which receives signals reflected by the object in front of the radar, a receiving unit which converts the received analog signal to digital signal; and a signal processor which generates 3D radar image, which comprises the steps of: a) generating RF signals to be radiated for observing object in front of the radar; b) radiating the RF signal generated by the transmitting unit to the outside through a transmitting antenna; c) receiving signals radiated from the transmitting antenna and reflected by the object in front of the radar; d) mixing the signal received by the receiving antenna and the branched signal from the transmitting unit, and converting the signal to digital signal; and e) receiving the digitally converted signal from the receiving unit through the signal processor, extracting phase information of the object in front of the radar, and generating 3D radar image by producing altitude information based on the principle of interferometer.

In the step a), after RF signal is generated by the transmitting unit, the method further comprises steps of selecting the optimal center frequency of transmitting waveform by a 4 channel filter bank and amplifying by a high power amplifier the output of the 4 channel filter bank.

In the step a), the RF signal, which is generated by the transmitting unit, is preferably generates UWB RF signal of wider than 1 GHz.

In the step d), the method can further comprise the steps of amplifying the signal (analog signal) received from the receiving antenna by a LNA, and amplifying the branched signal from the transmitting unit by an amplifier, and mixing the two signals by using a mixer.

Also, in step d), beat frequency of the LFM (Linear Frequency Modulation) signal is detected and sampled in order to mix the signal received by the receiving antenna and the RF signal transmitted by the transmitting unit, and to convert the signal to digital signal.

EFFECT OF THE INVENTION

By using the forward-looking 3D imaging radar of the present invention, it is possible to overcome the difficulty in applying delay device on the receiver by implementing independent receiver per receiving antenna, and the radar image can be processed in real time.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION

The invention will now be described with reference to the drawings attached.

Figure 1:
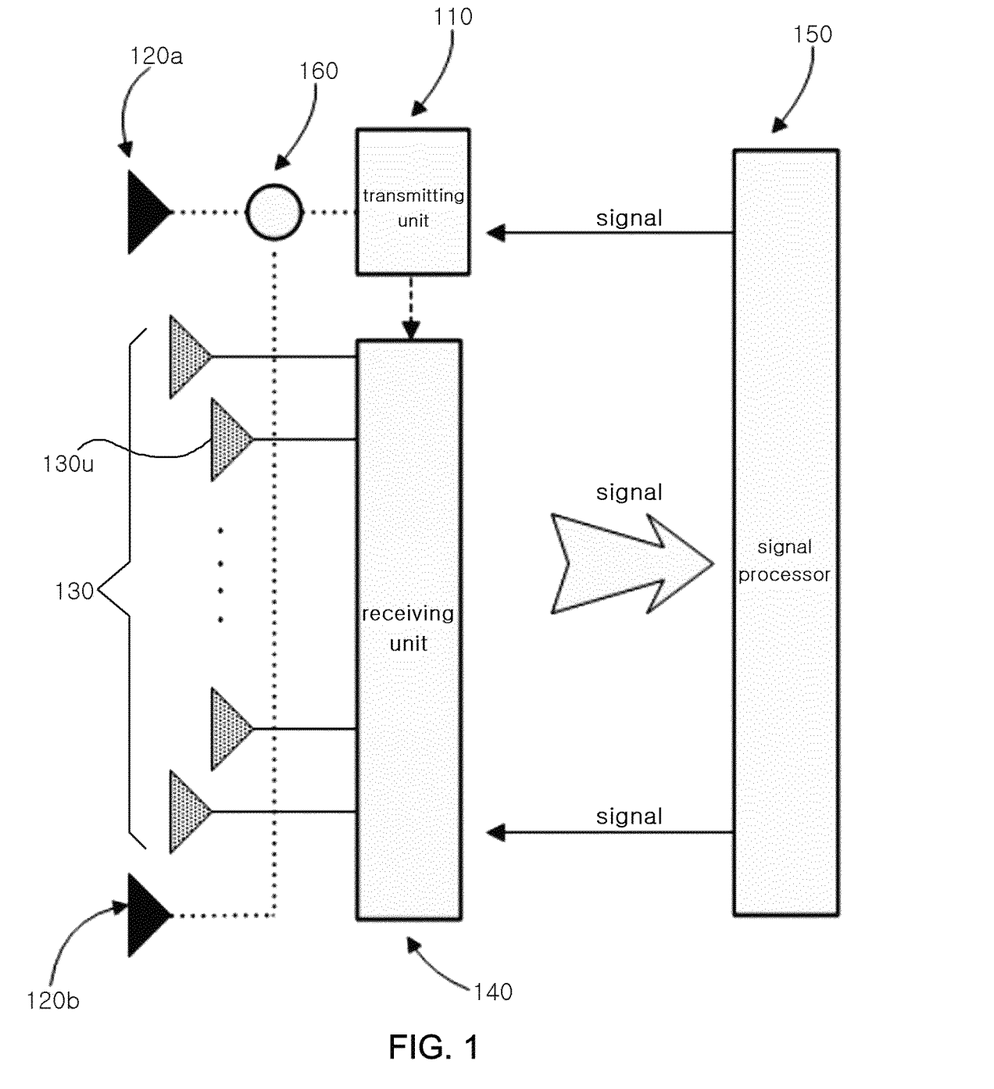
FIG. 1 shows schematically the overall architecture of the forward-looking 3D imaging radar of the present invention.
Figure 2:
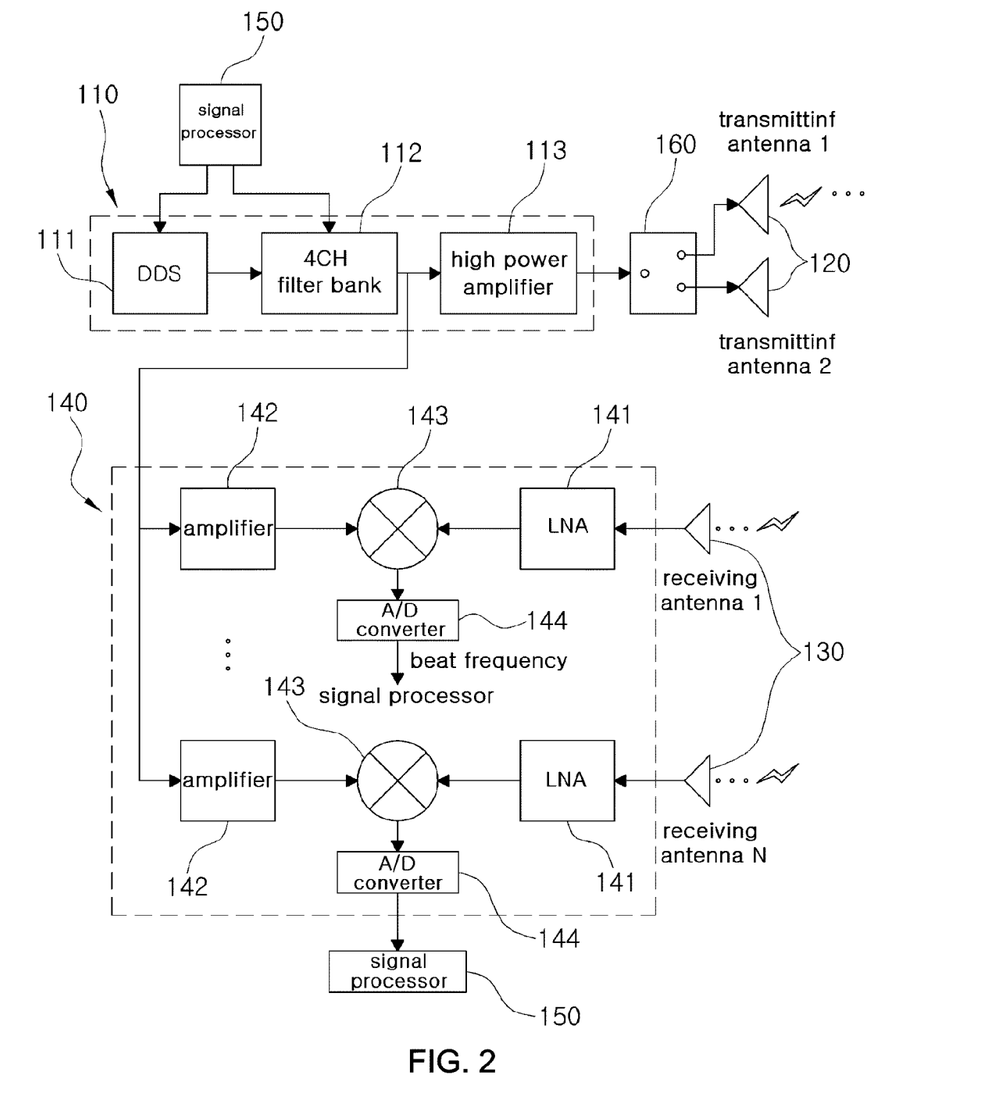
FIG. 2 shows the architecture of the transmitting unit and receiving unit of the forward-looking 3D imaging radar of the present invention.

FIGS. 1 and 2 show the forward-looking 3D imaging radar of the present invention, FIG. 1 shows schematically the overall architecture of the forward-looking 3D imaging radar of the present invention, and FIG. 2 is the structure of the transmitting unit and receiving unit of the forward-looking 3D imaging radar of the present invention.

Referring to FIGS. 1 and 2, the forward-looking 3D imaging radar of the present invention comprises a transmitting unit 110, transmitting antennas 120a, 120b, a receiving antenna 130, a receiving unit 140, a signal processor 150.

The transmitting unit 110 generates RF signals to be radiated for observing object in front of the radar.

The transmitting antennas 120a, 120b radiate the RF signal generated by the transmitting unit 110 to the outside.

The receiving antennas 130 receive signals radiated from the transmitting antenna 120 and reflected by the object in front of the radar.

The receiving unit 140 mixes the signal received by the receiving antennas 130 and the signal branched from the transmitting unit 110, and converts the analog signal to digital signal.

The signal processor 150 controls the operations of the transmitting unit 110 and receiving unit 140, sends command to the transmitting unit 110 to generate RF signals, receives the digitally converted signal from the receiving unit 140 and extracts phase information of the object in front of the radar, and generates 3D radar image by producing altitude information based on the principle of interferometer.

Here, as shown in FIG. 2, the transmitting unit 110 comprises a DDS 111 which generates transmitting waveform, a 4 channel filter bank 112 which selects the transmitting waveform having the optimal frequency on the basis of the waveform generated by the DDS 111, and a high power amplifier 113 which amplifies the output of the transmitting waveform selected through the 4 channel filter bank 112. The 4 channel filter bank 112 is necessary to select and use optimal frequency in consideration of the density of vegetation in front of the radar.

Also, the transmitting unit 110 preferably generates RF signal of UWB signal of wider than 1 GHz. The UWB signal is necessary since better range resolution can be obtained by using wider band signals. When signals of 2 GHz bandwidth are used, for example, aliasing can be avoided by the rate of 4 GHz sampling according to Nyquist sampling theory. But current A/D converters do not provide this high sampling rate and high bit resolution.

Figure 3:
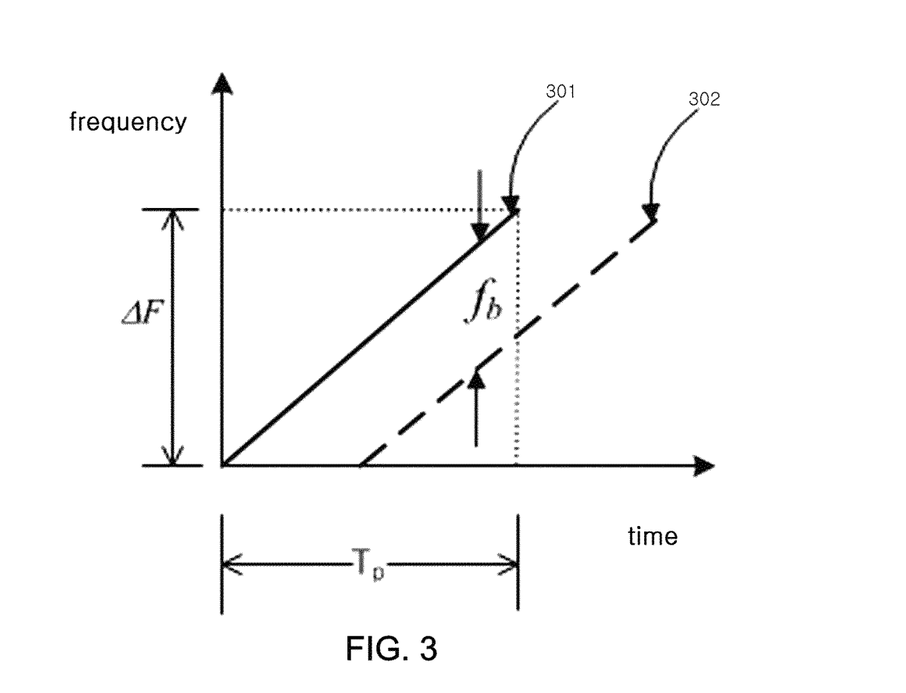
FIG. 3 shows the FM waveform transmitted by the transmitting unit of the forward-looking 3D imaging radar of the present invention.

So, in the present invention, LFM waveform as shown in FIG. 3 is transmitted and beat frequency sampling method is applied in the receiving unit 140, thereby reducing the A/D sampling rate. In FIG. 3, numeral 301 and 302 represent transmitting waveform and receiving waveform, respectively. Meanwhile, beat frequency $f_b$ is calculated by mathematical formula (1) below. In mathematical formula (1), R is distance, ΔF is bandwidth, c is velocity of light, $T_p$ is dwell time. When R=30 m, ΔF=2 GHz, $T_p$=0.4 msec, for example, $f_b$ becomes 1 MHz, and aliasing of the signal can be prevented with higher than 2 MHz in beat frequency sampling.

$$f_b = \frac{2R}{c} \times \frac{\Delta F}{T_p} \qquad \text{Mathematical Formula (1)}$$

An RF switch 160 can be installed between the transmitting antennas 120a, 120b and transmitting unit 110 to select an antenna among the two transmitting antennas 120a, 120b.

Also, the receiving unit 140, as shown in FIG. 2, comprises a LNA 141 for amplifying the signal (analog signal) received by the receiving antenna 130, an amplifier 142 for amplifying the branched signal from the transmitting unit 110, a mixer 143 for mixing the signal amplified by the LNA 141 and the signal amplified by the amplifier 142, and an A/D (analog-to-digital) converter 144 for converting the analog signal mixed by the mixer 143 to digital signal.

Figure 4:
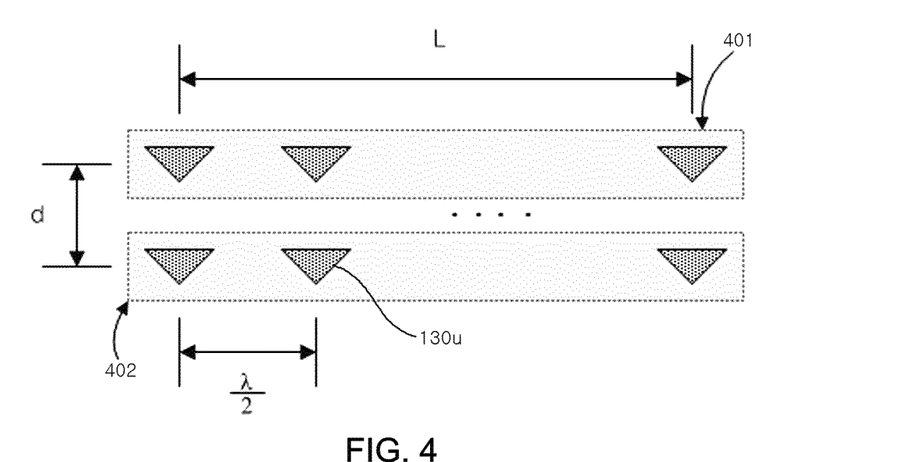
FIG. 4 shows the architecture of the receiving antenna array of the forward-looking 3D imaging radar of the present invention.

Also, the receiving antenna 130 is composed of an antenna array comprising a plurality of unit antennas 130u. This is for acquiring signals simultaneously with the array.

Also, the receiving antenna 130 array is disposed in 2 dimensional arrays, as shown in FIG. 4.

The horizontal interval between the unit antennas 130u in the receiving antenna 130 array is set to λ/2 and the vertical interval is set to d≦λ, λ is wavelength of the transmitting signal. Here, the horizontal interval value of λ/2 is determined by experiment in which image of optimal resolution can be obtained. Also, the vertical interval is set to d≦λ since the ambiguity of angle in the combination of each antenna can be resolved.

There is no special restriction on the antenna and any unit antenna 130u that can transmit and receive wide band signal can be used.

Now, the method of acquiring 3D image by using a forward-looking 3D imaging radar of the present invention will be described.

Figure 5:
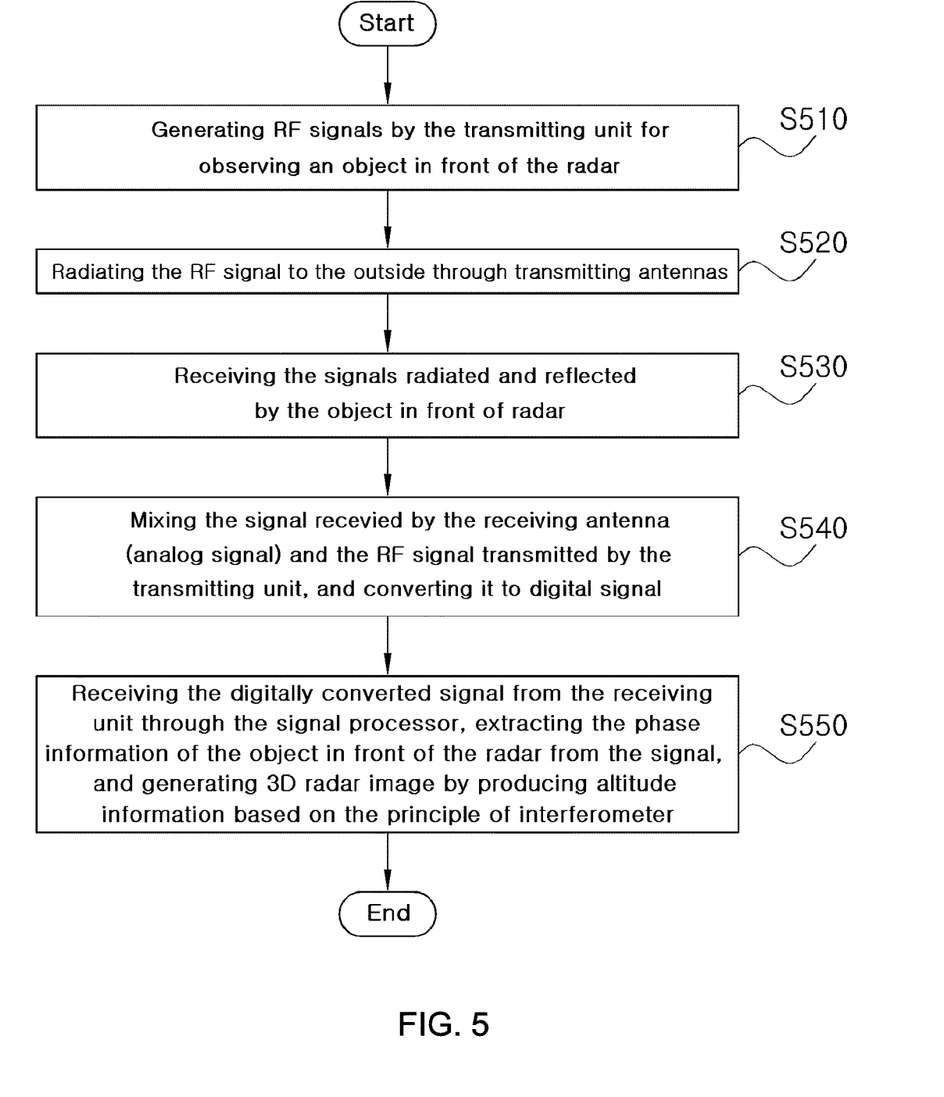
FIG. 5 is a flowchart illustrating the overall processes of the method of acquiring 3D image using the forward-looking 3D imaging radar of the present invention.

FIG. 5 is a flowchart illustrating the overall process of the method of acquiring 3D image using the forward-looking 3D imaging radar of the present invention.

Referring to FIG. 5, the method of acquiring 3D image of the present invention uses a forward-looking 3D imaging radar comprising a transmitting unit 110 which generates RF signals, a transmitting antennas 120*a*, 120*b* which radiate the RF signal, a receiving antenna 130 which receives signals reflected by the object in front of the radar, a receiving unit 140 which converts the received signal to digital signal; and a signal processor 150 which generates 3D radar image.

In the method of the present invention, first, RF signals are generated by the transmitting unit 110 to be radiated for observing object in front of the radar (step S510).

Then, RF signal generated by the transmitting unit is radiated to the outside through transmitting antennas 120*a*, 120*b* (step S520). Then, signals radiated from the transmitting antenna and reflected by the object in front of the radar are received by the receiving antenna 130 (step S530), and the signal received by the receiving antenna 130 and the RF signal transmitted by the transmitting unit 110 are mixed by the receiving unit 140, and converted to digital signal (step S540).

Then the digitally converted signal from the receiving unit 140 is received through the signal processor 150, phase information of the object in front of the radar is extracted, and 3D radar image is generated by producing altitude information based on the principle of interferometer (step S550). The process of extracting phase information of the object and generating 3D radar image by producing altitude information based on the principle of interferometer will be described in more detail later with reference to FIG. 8.

The method comprises the steps of selecting by a 4 channel filter bank the transmitting waveform having the optimal frequency on the basis of the waveform, and amplifying by a high power amplifier the output of the transmitting waveform selected through the 4 channel filter bank.

At the step S510, after generating RF signal by the transmitting unit 110, the method further comprises the steps of selecting by a 4 channel filter bank 112 the transmitting waveform having the optimal frequency on the basis of the waveform, and amplifying by a high power amplifier 113 the output of the transmitting waveform selected through the 4 channel filter bank.

Also at the step S540, the method further comprise the steps of amplifying the signal (analog signal) received from the receiving antenna 130 by a low-noise amplifier 141, and amplifying the branched signal from the transmitting unit 110 by an amplifier 142, and mixing the two signals by using a mixer 143.

Also, at the step S540, beat frequency of the LFM signal is detected and sampled in order to mix the signal received by the receiving antenna 130 and the RF signal transmitted by the transmitting unit 110, and to convert the analog signal to digital signal. The method of sampling beat frequency has been described above with regard to mathematical formula (1), and will be omitted.

In these series of processes, more details will be described in regard to transmitting and receiving signals by the transmitting unit 110 and receiving unit 140, and signal processing by the signal processor 150 with reference to FIG. 6.

Figure 6:
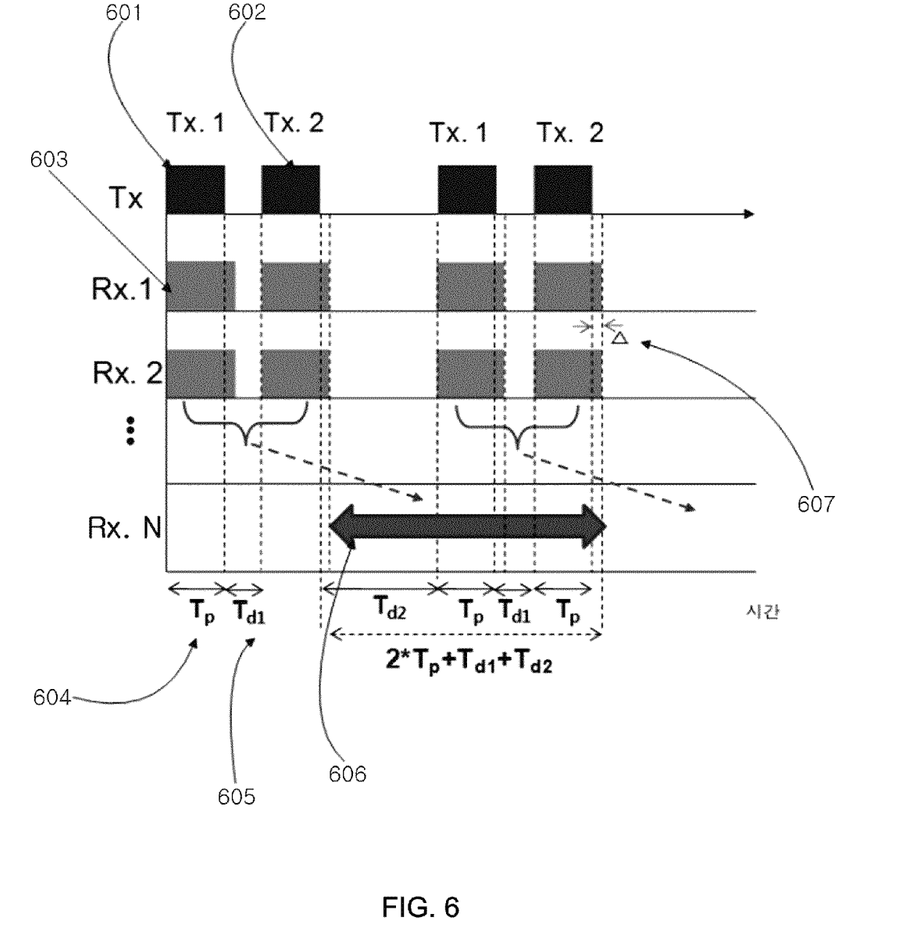
FIG. 6 is a timing diagram of transmitting and receiving, and processing signals in the method of acquiring 3D image of the present invention.

FIG. 6 is a timing diagram of transmitting and receiving, and processing signals in the method of acquiring 3D image of the present invention.

Referring to FIG. 6, waveform is transmitted through transmitting antenna "Tx.1" represented by numeral 601 with time of 604, namely $T_p$ time (dwell time), and signal is simultaneously received by all receiving antennas from "Rx.1" to "Rx.N" receiving time of antenna "Rx.1" is represented by numeral 603. At this step, the time Δ, namely the time of 607, is a time corresponding to the round-trip distance to the maximum detection range. Therefore, for the time of "$T_p+\Delta$", the receiving antenna receives the signal. The time $T_{d1}$ of 605 is the time for preparing transmission of waveform through "Tx.2" antenna of 602. And, the time represented by 606 is the time required for signal processing.

Meanwhile, as to the method for generating radar image from the RF received signal acquired by the receiving antenna, SAR (Synthetic Aperture Radar) imaging method such as Back Projection or ω-K migration method is applied. While specific explanation on the above methods will be omitted, the method of acquiring 3D image of the present invention will be described based on Back-projection algorithm. The image pixels acquired by two receiving antennas separated by distance d, as shown in FIG. 4, have phase information $\phi_1$ and $\phi_2$. To obtain altitude information of one pixel, the difference of distance ΔR as shown in FIG. 7, namely the difference of distance between the measured distance $R_1$ which is the distance from the first receiving antenna (Ant1) to the object in front of the antenna, and measured distance $R_2$ which is the distance from the second receiving antenna (Ant2) to the object in front of the antenna, is needed, which can be obtained from relation with the phase difference φ, ΔR, and the wavelength λ of the received signal by using the mathematical formula (2).

$$\phi = \phi_1 - \phi_2 = \frac{2\pi}{\lambda}\Delta R, \quad \Delta R = \frac{\lambda}{2\pi}\phi \qquad \text{Mathematical Formula (2)}$$

Figure 7:
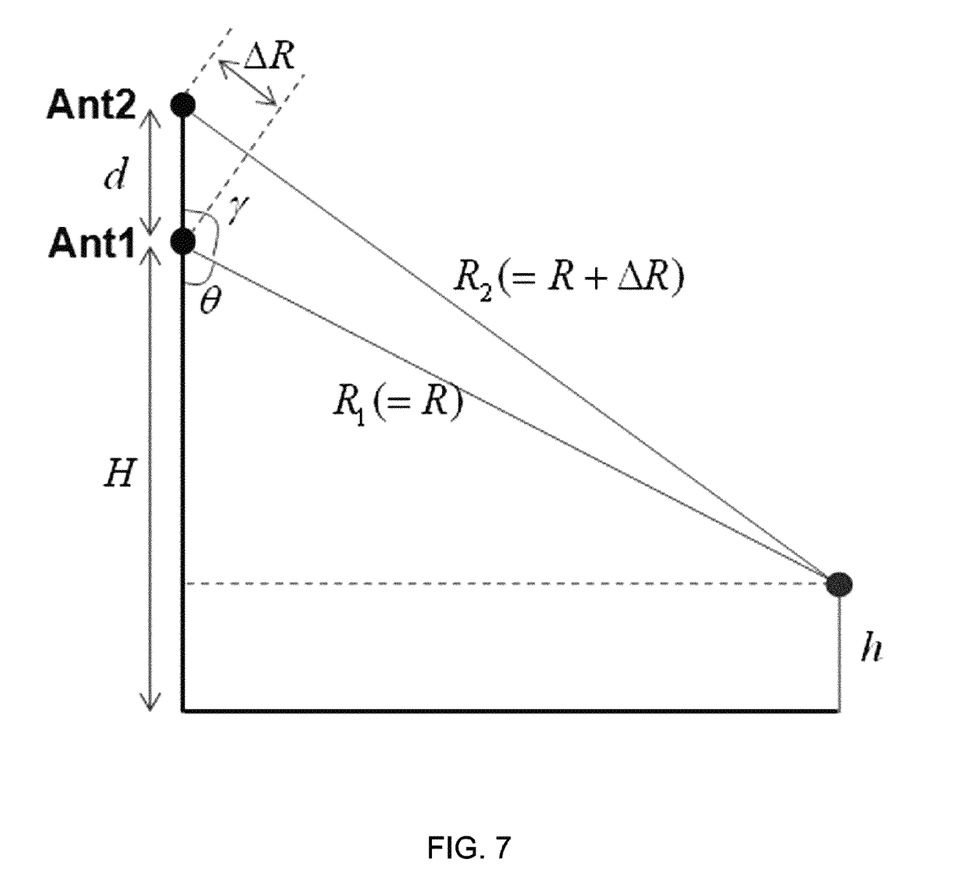
FIG. 7 illustrates the theory of acquiring altitude information from two antennas.

The altitude information h of FIG. 7 can be calculated by using the mathematical formula (3), from the distance d between two antennas, height H of installed antenna, the distance R the first receiving antenna (Ant1) to the object in front of the antenna, and the phase difference calculated by the mathematical formula (2).

$$h = H + \frac{d}{2} - \frac{\Delta R}{2d}(2R + \Delta R) \qquad \text{Mathematical Formula (3)}$$

Figure 8:
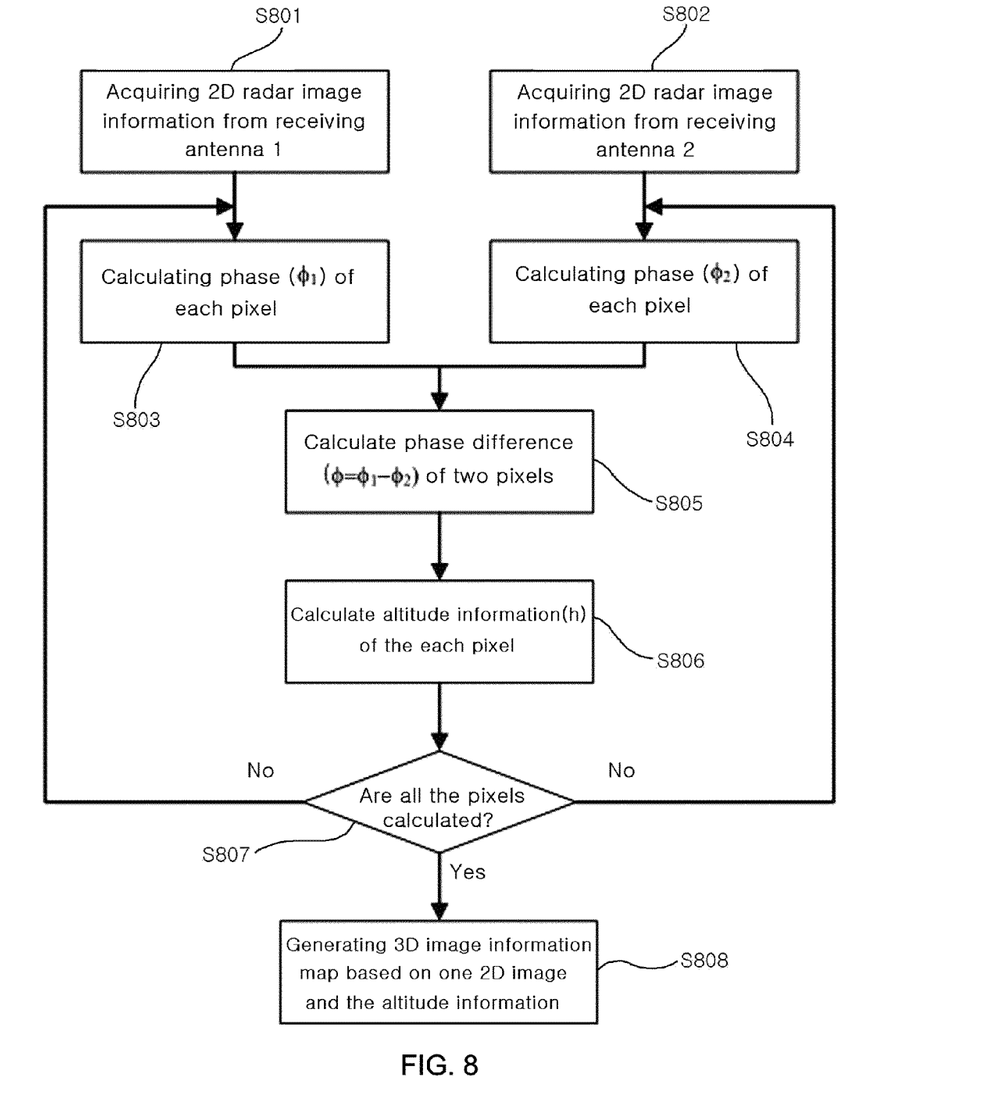
FIG. 8 is a flowchart illustrating the process of acquiring 3D image information using the two-rows antenna array.

FIG. 8 is a flowchart illustrating the process of acquiring 3D image information using the two-rows antenna array.

Referring to FIG. 8 which shows more detailed process of extracting phase information in the step S550 of flowchart of FIG. 5 and generating 3D radar image by generating altitude information based on the principle of interferometer, 2D radar image information is acquired by using the signals measured by the first and second rows (401 and 402 in FIG. 4) of the receiving antenna (steps S801, S802).

Then, phases ($\phi_1$, $\phi_2$) of each pixel from the information of the acquired image is calculated (steps S803, S804). Then, phase difference ($\phi=\phi_1-\phi_2$) of two pixels from the phases ($\phi_1$, $\phi_2$) is calculated (step S805). At this step, the phase difference ($\phi=\phi_1-\phi_2$) can be calculated by using the above mathematical formula (2).

Then, altitude information (h) of the each pixel is calculated (step S806). The altitude information (h) can be calculated by using the above mathematical formula (3).

After calculating the phase difference ($\phi=\phi_1-\phi_2$) and altitude information (h), it is determined whether all the pixels are calculated (step S807). When all the pixels are not determined to be calculated in the above step (namely, there remain uncalculated pixels), the process is returned to the step S803, S804 for the first and second rows of the receiving antenna, and when all the pixels are calculated, 3D image information map based on one 2D image and the altitude information calculated in the step S806 is generated (step S808).

The process of FIG. 8 as described above is a method for acquiring 3D image information after transmitting RF signal by using one transmitting antenna. But there are methods for improving the quality of the image by using two transmitting antennas.

Method 1: Averaging the Pixel Information of 3D Image a) acquires two 2D images and altitude information by transmitting RF signals by using the first transmitting antenna (120a in FIG. 1) and carrying out the process by using two receiving antenna arrays (receiving antenna arrays 401 and 402 in FIG. 4) as shown in the FIG. 8.

b) acquires two 2D images and altitude information by transmitting RF signals by using the second transmitting antenna (120b in FIG. 1) and carrying out the process by using two receiving antenna arrays (receiving antenna arrays 401 and 402 in FIG. 4) as shown in the FIG. 8.

c) generates 3D image information map by generating average map of the 2D image and altitude information, which is generated by calculating the amount of motion of the 2D image and altitude information acquired in the steps a) and b) by using a image registration method or a tachometer installed on the vehicle, and compensates the 2D image and altitude information by reflecting the calculated amount of motion to the 2D image and altitude information acquired by the step b).

Method 2: Averaging the Phases Obtained by the First Receiving Unit and the Second Receiving Unit a) transmits RF signals by using the first transmitting antenna (120a in FIG. 1) and acquires raw data containing phase information by using two receiving antenna arrays (receiving antenna arrays 401 and 402 in FIG. 4).

b) transmits RF signals by using the second transmitting antenna (120b in FIG. 1) and acquires raw data containing phase information by using two receiving antenna arrays (receiving antenna arrays 401 and 402 in FIG. 4).

c) When the vehicle carrying the radar moves after transmitting RF through the first transmitting antenna, the phase information obtained by the second transmitting antenna varies according to the movement of the vehicle. So, the phase is compensated by first measuring the velocity of a vehicle through built-in tachometer, thereby calculating moved distance, then calculating phase compensation value ($\phi_{comp}$) by using the mathematical formula (4) for compensating the change in the phase information obtained by the second transmitting antenna, and reflecting the calculated compensation value ($\phi_{comp}$) to the raw data obtained in the step b);

$$\phi_{comp} = 2\pi \times f_c \times \frac{2 \times v \times T_a}{c},$$ Mathematical Formula (4)

where $f_c$ is center frequency, v is velocity of the vehicle, c is velocity of light, and $T_a$ corresponds to $T_p + T_{d1}$ in FIG. 6.

d) evaluates the average of the phase of each raw data obtained in the step a) and in the step c) per two receiving antenna arrays (receiving antenna arrays 401 and 402 in FIG. 4).

e) obtains 2D images by using each of the two data which is phase-averaged, and generates 3D image information map by performing the process in the order as described in the flowchart of FIG. 8.

As described above, according to the forward-looking 3D imaging radar and the method for acquiring 3D image by using the forward-looking 3D imaging radar of the present invention two 2D images are generated by using row of each receiving antenna, and altitude information is obtained based on the phase difference in the phases of the two 2D images by using the principle of interferometer. Therefore, by applying the forward-looking 3D imaging radar in the autonomous vehicle, the performance of the autonomous vehicle can be greatly improved.

By using the forward-looking 3D imaging radar of the present invention, it is possible to overcome the difficulty in applying delay device on the receiver by implementing independent receiver per receiving antenna, and the radar image can be processed in real time.

The present invention has been described in detail with reference to a preferable example. The invention, however, is not limited by the example, and it is obvious that the example can be variously modified by those skilled in the art within the scope of the present invention. Accordingly, the scope of the invention should be interpreted by the claims attached, and all technical ideas which are equivalent to the present invention should be regarded as belonging to the scope of the present invention.

| Description on the numerals in the drawing | |
|---|---|
| 110 | transmitting unit |
| 111 | DDS (Direct Digital Synthesizer) |
| 112 | 4 channel filter bank |
| 113 | high power amplifier |
| 120a, 120b | transmitting antennas |
| 130 | receiving antenna |
| 140 | receiving unit |
| 141 | LNA (low-noise amplifier) |
| 142 | amplifier |
| 143 | mixer |
| 144 | A/D converter |
| 150 | signal processor |
| 160 | RF switch |

What is claimed is:

1. A forward-looking 3D imaging radar, comprising:

a transmitting unit which generates RF signals to be radiated for observing object in front of the radar;

a transmitting antenna which radiates the RF signal generated by the transmitting unit;

a receiving antenna which receives signals radiated from the transmitting antenna and reflected by the object in front of the radar;

a receiving unit which mixes the signal received by the receiving antenna and the branched signal from the transmitting unit, and converts the signal to digital signal; and a signal processor which controls the operations of the transmitting unit and receiving unit, sends command to the transmitting unit to generate RF signals, receives the digitally converted signal from the receiving unit, compensates phase using a phase compensation value ($\phi_{comp}$) calculated by the below formula using distance of motion of a vehicle measured by a tachometer installed on the vehicle, extracts phase information of the object in front of the radar, and generates 3D radar image by producing altitude information based on the principle of interferometer:

$$\phi_{comp} = 2\pi \times f_c \times \frac{2 \times v \times T_a}{c}$$

where ($\phi_{comp}$) is the phase compensation value, $f_c$ is center frequency, v is velocity of the vehicle, c is velocity of light, and $T_a$ corresponds to $T_p$ (dwell time)+$T_{d1}$ (time for preparing transmission of waveform through a second transmitting antenna).

2. The forward-looking 3D imaging radar of claim 1, wherein the transmitting unit comprises a DDS (Direct Digital Synthesizer) which generates transmitting waveform, a 4 channel filter bank which selects the transmitting waveform having the optimal frequency on the basis of the waveform generated by the DDS, and a high power amplifier which amplifies the output of the 4 channel filter bank.

3. The forward-looking 3D imaging radar of claim 1, wherein the transmitting unit generates RF signal of UWB signal of wider than 1 GHz.

4. The forward-looking 3D imaging radar of claim 1, wherein the transmitting antenna is composed of 2 antennas.

5. The forward-looking 3D imaging radar of claim 4, wherein an RF switch is installed between the transmitting antenna and transmitting unit to select an antenna among the two transmitting antennas.

6. The forward-looking 3D imaging radar of claim 1, wherein the receiving antenna is composed of an antenna array comprising a plurality unit antennas.

7. The forward-looking 3D imaging radar of claim 6, wherein the receiving antenna array is disposed in 2 dimensional arrays.

8. The forward-looking 3D imaging radar of claim 7, wherein the horizontal interval between the unit antennas in the receiving antenna array is set to $\lambda/2$ and the vertical interval is set to $d \leq \lambda$, where $\lambda$ is wavelength of the transmitting signal.

9. A method of acquiring 3D image by using a forward-looking 3D imaging radar comprising a transmitting unit which generates RF signals, a transmitting antenna which radiates the RF signal, a receiving antenna which receives signals reflected by the object in front of the radar, a receiving unit which converts the received signal to digital signal; and a signal processor which generates 3D radar image, which comprises the steps of:
   a) generating RF signals to be radiated for observing object in front of the radar;
   b) radiating the RF signal generated by the transmitting unit to the outside through transmitting antenna;
   c) receiving signals radiated from the transmitting antenna and reflected by the object in front of the radar;
   d) mixing the signal received by the receiving antenna and the signal branched from the transmitting unit, and converting the analog signal to digital signal; and
   e) receiving the digitally converted signal from the receiving unit through the signal processor, compensating phase using a phase compensation value ($\phi_{comp}$) calculated by the below formula using distance of motion of a vehicle measured by a tachometer installed on the vehicle, extracting phase information of the object in front of the radar, and generating 3D radar image by producing altitude information based on the principle of interferometer:

$$\phi_{comp} = 2\pi \times f_c \times \frac{2 \times v \times T_a}{c}$$

where $\phi_{comp}$ is the phase compensation value, $f_c$ is center frequency, v is velocity of the vehicle, c is velocity of light, and $T_a$ corresponds to $T_p$ (dwell time)+$T_{d1}$ (time for preparing transmission of waveform through a second transmitting antenna).

10. The method of acquiring 3D image of claim 9, wherein beat frequency of the LFM (Linear Frequency Modulation) signal is detected and sampled in order to mix the signal received by the receiving antenna and the RF signal transmitted by the transmitting unit, and to convert the signal to digital signal.

11. The method of acquiring 3D image of claim 9, wherein the process of extracting phase information of the object in front of the radar and generating 3D radar image by producing altitude information based on the principle of interferometer in the step e) comprises the steps of:
   e-1) acquiring respective 2D radar image information by using the signals measured by the first and second rows of the receiving antenna;
   e-2) calculating phases ($\phi_1, \phi_2$) of each pixel from the image information acquired;
   e-3) calculating phase difference ($\phi = \phi_1 - \phi_2$) of two pixels from the phases ($\phi_1, \phi_2$) of each pixel calculated above;
   e-4) calculating altitude information (h) of the each pixel;
   e-5) determining whether all the pixels are calculated after calculating the phase difference ($\phi = \phi_1 - \phi_2$) and altitude information (h);
   e-6) returning the process to the step e-2), when all the pixels are not determined to be calculated in step e-5), for the first and second rows of the receiving antenna; and
   e-7) generating 3D image information map, when all the pixels are calculated in step e-5), based on one 2D image and the altitude information calculated in the step e-4).

12. The method of acquiring 3D image of claim 11, wherein calculating the phase difference ($\phi = \phi_1 - \phi_2$) in the step e-3) is carried out by using the formula:

$$\phi = \phi_1 - \phi_2 = \frac{2\pi}{\lambda} \Delta R, \quad \Delta R = \frac{\lambda}{2\pi} \phi,$$

where $\lambda$ is the wavelength of the received signal, and $\Delta R$ is the difference between the measured distance $R_1$ which is the distance from the first receiving antenna (Ant1) to the object in front of the antenna, and measured distance $R_2$ which is the distance from the second receiving antenna (Ant2) to the object in front of the antenna.

13. The method of acquiring 3D image of claim 11, wherein the step of calculating the altitude information (h) in the step e-4) is calculated by the formula:

$$h = H + \frac{d}{2} - \frac{\Delta R}{2d}(2R + \Delta R),$$

where H is the height of the installed antenna, d is the distance between two antennas, R is the measured distance from the first receiving antenna (Ant1) to the object in front of the antenna, $\Delta R$ is the difference between the measured distance $R_1$ which is the distance from the first receiving antenna (Ant1) to the object in front of the antenna, and measured distance $R_2$ which is the distance from the second receiving antenna (Ant2) to the object in front of the antenna.

* * * * *